United States Patent
Hallivuori et al.

(10) Patent No.: US 9,602,352 B2
(45) Date of Patent: Mar. 21, 2017

(54) NETWORK ELEMENT OF A SOFTWARE-DEFINED NETWORK

(71) Applicants: Ville Hallivuori, Espoo (FI); Juhamatti Kuusisaari, Helsinki (FI)

(72) Inventors: Ville Hallivuori, Espoo (FI); Juhamatti Kuusisaari, Helsinki (FI)

(73) Assignee: CORIANT OY, Espoo (FI)

( * ) Notice: Subject to any disclaimer, the term of this patent is extended or adjusted under 35 U.S.C. 154(b) by 111 days.

(21) Appl. No.: 14/277,129

(22) Filed: May 14, 2014

(65) Prior Publication Data

US 2014/0341074 A1 Nov. 20, 2014

(30) Foreign Application Priority Data

May 15, 2013 (FI) .................................. 20135519 U

(51) Int. Cl.
*H04L 12/28* (2006.01)
*H04L 12/24* (2006.01)

(52) U.S. Cl.
CPC ................................ *H04L 41/0853* (2013.01)

(58) Field of Classification Search
CPC .. H04L 41/0806; H04L 41/0853; H04L 69/24
See application file for complete search history.

(56) References Cited

U.S. PATENT DOCUMENTS

| 7,380,025 | B1 | 5/2008 | Riggins et al. |
| 8,355,344 | B1 | 1/2013 | Lounsberry |

(Continued)

FOREIGN PATENT DOCUMENTS

| WO | 2004095278 A1 | 11/2004 |
| WO | 2005029813 A1 | 3/2005 |
| WO | 2014068444 A1 | 5/2014 |

OTHER PUBLICATIONS

"Openflow Switch Specification Version 1.1.0 Implemented", 2011, pp. 1-56, XP008166938, URL:http://web.archive.org/web/20110516201950/http://www.openflow.org/documents/openflow-spec-v1.1.0.pdf.

(Continued)

*Primary Examiner* — Khaled Kassim
*Assistant Examiner* — Berhanu Belete
(74) *Attorney, Agent, or Firm* — Young & Thompson

(57) ABSTRACT

A network element of a software-defined network includes functional entities (321-325) capable of transferring data between each other and providing connections to other network elements. One or more of the functional entities are configurable with configuration data received from a controller of the software-defined network. The network element is adapted to transmit, to the controller, entity-specific capability descriptors related to the functional entities configurable with the configuration data. Each entity-specific capability descriptor expresses operations capable of being carried out by the respective functional entity. As the controller is made aware of the capabilities of the functional entities, the goal of the software-defined networking to provide controlled management of the data-forwarding functionality of a network element as a whole can be extended to the functional entities, e.g. line interface modules, so that each functional entity can be configured individually in accordance with the capabilities and resources of the functional entity.

23 Claims, 5 Drawing Sheets

(56) References Cited

U.S. PATENT DOCUMENTS

| | | | | |
|---|---|---|---|---|
| 8,406,748 B2* | 3/2013 | Raleigh | | G06Q 30/0601 379/201.05 |
| 8,693,374 B1* | 4/2014 | Murphy | | H04L 12/28 370/255 |
| 8,811,212 B2* | 8/2014 | Beheshti-Zavareh | | H04L 45/64 370/252 |
| 9,038,151 B1* | 5/2015 | Chua | | H04L 45/02 709/223 |
| 9,178,807 B1* | 11/2015 | Chua | | H04L 45/02 |
| 2003/0174644 A1* | 9/2003 | Yagyu | | H04L 41/0663 370/228 |
| 2008/0013533 A1* | 1/2008 | Bogineni | | H04L 41/12 370/389 |
| 2008/0056240 A1* | 3/2008 | Ellis | | H04Q 11/04 370/352 |
| 2012/0155467 A1* | 6/2012 | Appenzeller | | H04L 45/54 370/392 |
| 2013/0028135 A1* | 1/2013 | Berman | | H04L 12/4625 370/254 |
| 2013/0070762 A1 | 3/2013 | Adams et al. | | |
| 2013/0148498 A1* | 6/2013 | Kean | | H04L 41/0893 370/230 |
| 2013/0163427 A1* | 6/2013 | Beliveau | | H04L 67/327 370/235 |
| 2013/0163475 A1* | 6/2013 | Beliveau | | H04L 67/327 370/257 |
| 2013/0343213 A1* | 12/2013 | Reynolds | | H04L 43/045 370/252 |
| 2014/0059225 A1* | 2/2014 | Gasparakis | | H04L 29/0818 709/226 |
| 2014/0098669 A1* | 4/2014 | Garg | | H04L 45/38 370/235 |
| 2014/0129687 A1* | 5/2014 | Halpern | | H04L 41/0806 709/221 |
| 2014/0169158 A1* | 6/2014 | Mishra | | H04L 69/04 370/228 |
| 2014/0280835 A1* | 9/2014 | Pruss | | H04L 41/0206 709/223 |
| 2014/0286177 A1* | 9/2014 | Ni | | H04L 43/026 370/250 |
| 2015/0009826 A1* | 1/2015 | Ma | | H04W 28/0268 370/235 |

OTHER PUBLICATIONS

European Search Report, dated Aug. 8, 2014, from corresponding EP application.

FI Search Report, dated Feb. 13, 2014, from corresponding FI application.

* cited by examiner

NETWORK ELEMENT OF A SOFTWARE-DEFINED NETWORK

FIELD OF THE INVENTION

The invention relates generally to a software-defined network "SDN". More particularly, the invention relates to a network element for a software-defined network and to a controller of a software-defined network. Furthermore, the invention relates to a method for enabling a controller of a software-defined network to configure a network element and to a method for configuring a network element of a software-defined network. Furthermore, the invention relates to a computer program for a network element of a software-defined network and to a computer program for a controller of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

Using the analogy of the postal service, the software-defined networking works, for any given street location, so that all the letters from all the tenants would first be aggregated by a network element on an edge a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations. It is to be noted that the above-presented analogy between the software-defined networking and the postal service is a strong simplification and it gives only a limited viewpoint about the versatile possibilities provided by the software-defined networking.

The software defined networking is, however, not free from challenges. Some of the challenges are related to configuring network elements so that different functional entities, e.g. line interface modules, of the network elements are constantly capable of carrying out the required tasks and so that the resources of the network elements are utilized in a sufficiently optimal way. Currently, there is still a need for technical solutions that are suitable for configuring network elements so that the above-mentioned goals are achieved.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new method for enabling a controller of a software-defined network to configure a network element of the software-defined network "SDN". The network element comprises functional entities that are capable of transferring data between each other. One or more of the functional entities are configurable with configuration data received from the controller of the software-defined network. Each functional entity can be, for example but not necessarily, a line interface module of the network element or a part of a line interface module such as an egress-side of the line interface module or an ingress-side of the line interface module. On the other hand, it is also possible that a functional entity includes two or more separate physical entities. For example, a functional entity may comprise e.g. a line interface module and e.g. a switch fabric module.

The method comprises transmitting, to the controller of the software-defined network, one or more entity-specific capability descriptors related to the one or more functional entities configurable with the configuration data, where each of the entity-specific capability descriptors expresses operations capable of being carried out by the functional entity related to the entity-specific capability descriptor under consideration.

As the above-mentioned controller of the software-defined network is made aware of the capabilities of the functional entities, the goal of the software-defined networking to provide controlled management of the data-forwarding functionality of the network element as a whole can be extended to the functional entities, e.g. line interface modules, of the network element so that each functional entity can be configured individually in accordance with the capabilities and resources of the functional entity under consideration.

In accordance with the invention, there is provided also a new method for configuring a network element of a software-defined network. The method comprises:

forming configuration data for the network element, and transmitting the configuration data to the network element.

The method phase for forming the configuration data comprises:

forming entity-specific portions of the configuration data for functional entities of the network element in accordance with entity-specific capability descriptors related to the functional entities, and providing the entity-specific portions of the configuration data with entity-identifiers so as to enable the network element to allocate the entity-specific portions of the configuration data to respective ones of the functional entities and to configure each of the functional entities with an appropriate entity-specific portion of the configuration data.

In accordance with the invention, there is provided also a new network element for a software-defined network. The network element can be, for example, an Internet Protocol "IP" router, a multiprotocol label switching "MPLS" switch, a packet optical switch, and/or an Ethernet switch. A network element according to the invention comprises functional entities capable of transferring data between each other, and one or more of the functional entities are configurable with configuration data received from a controller of the software-defined network. The network element comprises a processing system adapted to control the network element to transmit, to the controller of the software-defined network, one or more entity-specific capability descriptors related to the one or more functional entities configurable with the configuration data, where each of the entity-specific capability descriptors expresses operations capable of being carried out by the functional entity related to the entity-specific capability descriptor under consideration.

In accordance with the invention, there is provided also a new controller for configuring a network element of a software-defined network. The controller can be a single apparatus or a combination of a plurality of apparatuses capable of communicating with each other. A controller according to the invention comprises:

a data transfer interface for receiving data from the network element and for transmitting data to the network element, and a processing system for forming configuration data for the network element.

The processing system of the controller is adapted to:

form entity-specific portions of the configuration data for functional entities of the network element in accordance with entity-specific capability descriptors related to the functional entities, and provide the entity-specific portions of the configuration data with entity-identifiers so as to enable the network element to allocate the entity-specific portions of the configuration data to respective ones of the functional entities and to configure each of the functional entities with an appropriate entity-specific portion of the configuration data.

In accordance with the invention, there is provided also a new software-defined network that comprises one or more network elements according to the invention and a controller according to the invention. It is to be noted that the controller or one or more parts of it can also act as one or more network elements that can be e.g. an Internet Protocol "IP" router, a multiprotocol label switching "MPLS" node, a packet optical switch, and/or an Ethernet switch.

In accordance with the invention, there is provided also a new computer program for a network element of a software-defined network. The computer program comprises computer executable instructions for controlling a programmable processing system of the network element to:

control the network element to transmit, to a controller of the software-defined network, one or more entity-specific capability descriptors related to one or more functional entities of the network element, wherein each of the one or more functional entities is configurable with configuration data received from the controller, and each of the entity-specific capability descriptors expresses operations capable of being carried out by the functional entity related to the entity-specific capability descriptor under consideration.

In accordance with the invention, there is provided also a new computer program for the controller of the software-defined network. The computer program comprises computer executable instructions for controlling a programmable processing system of the controller to:

form entity-specific portions of configuration data for functional entities of a network element in accordance with entity-specific capability descriptors related to the functional entities, and provide the entity-specific portions of the configuration data with entity-identifiers so as to enable the network element to allocate the entity-specific portions of the configuration data to respective ones of the functional entities and to configure each of the functional entities with an appropriate entity-specific portion of the configuration data.

In accordance with the invention, there is provided also a new computer program product. The computer program product comprises a non-volatile computer readable medium, e.g. a compact disc "CD", encoded with a computer program according to the invention for a network element of a software-defined network and/or with a computer program according to the invention for a controller of the software-defined network.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1:
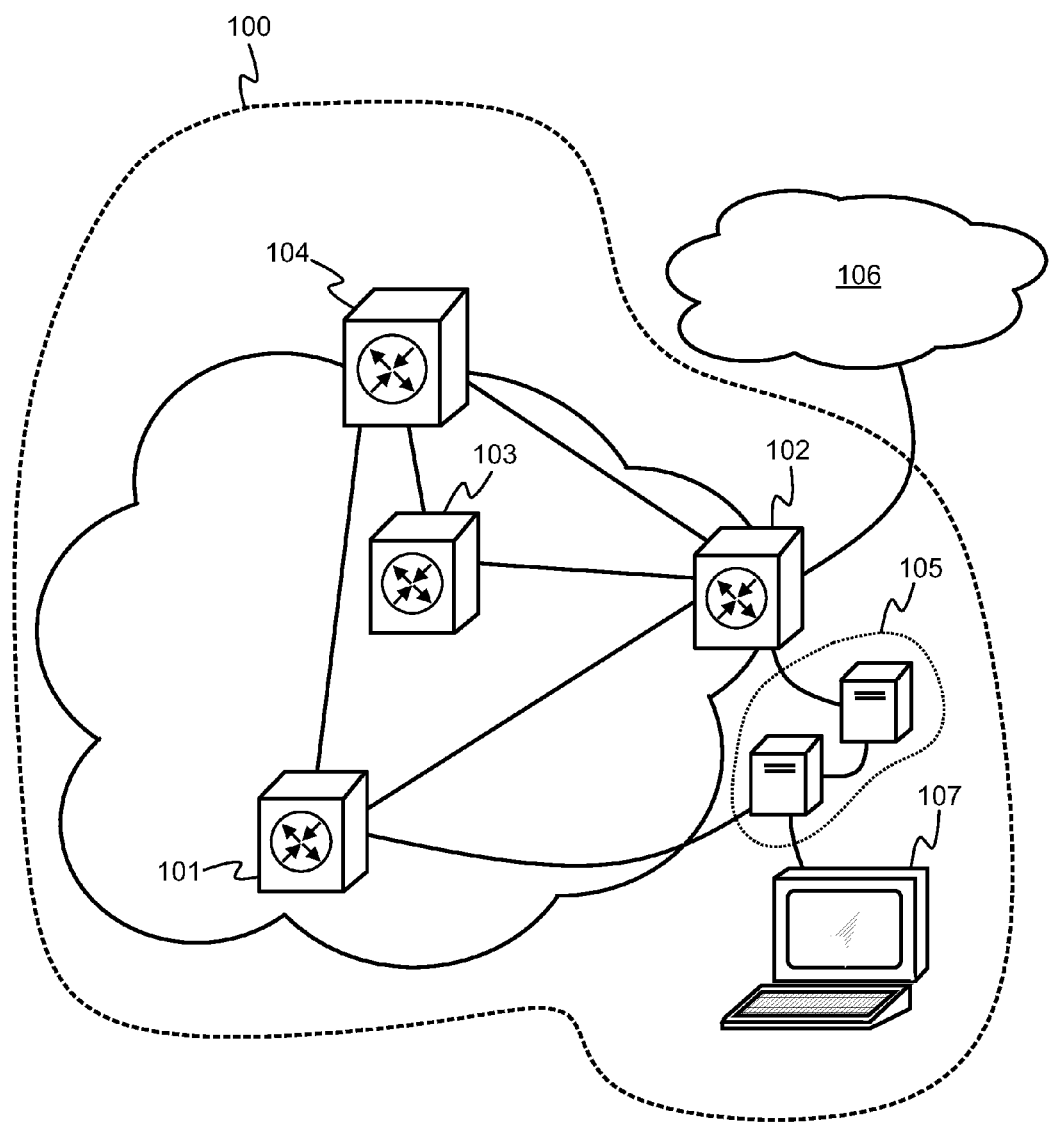
FIG. 1 shows a schematic illustration of a software-defined network comprising network elements according to an exemplifying embodiment of the invention and a controller according to an exemplifying embodiment of the invention.

FIG. 1 shows a schematic illustration of an exemplifying software-defined network "SDN" 100. The software-defined network comprises network elements 101, 102, 103, and 104 and a controller 105. The network elements 101-104 of this exemplifying software-defined network are mutually interconnected with data transfer links as illustrated in FIG. 1. Furthermore, the exemplifying software-defined network "SDN" 100 may comprise other network elements that are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, the controller 105 may consist of a single apparatus or a combination of a plurality of apparatuses. In the exemplifying case illustrated in FIG. 1, the controller 105 comprises two interconnected apparatuses. A terminal device 107 is connected to the controller 105 and the network element 102 acts as a gateway to an external network 106 that can be e.g. the global Internet. The controller 105 comprises a data transfer interface for receiving data from the terminal device 107 and/or from one or more other devices connected with data transfer links to the data transfer interface of the controller. It is to be noted that the controller 105 or one or more parts of it can also act as one or more network elements that can be e.g. an Internet Protocol "IP" router, a multi-protocol label switching "MPLS" switch, a packet optical switch, and/or an Ethernet switch.

The controller 105 is adapted to send, to at least one of the network elements 101-104, configuration data that comprises data items for configuring the network element under consideration to maintain a configuration system that enables the network element to manage data in a desired manner. The configuration system comprises typically a system of interconnected look-up tables defining actions to be carried out in different operational situations. The data can be in form of data frames such as for example Internet Protocol IP-packets, MPLS-labeled frames, Ethernet frames, or the data can be in some other form accordant with one or more data transfer protocols being used. The controller 105 can be adapted to configure the network element under consideration in accordance with the ForCES or some other suitable protocol. More details about the ForCES can be found from the Request for Comments "RFC": 3746 *"Forwarding and Control Element Separation"*, the Internet Engineering Task Force "IETF", Network Working Group. Furthermore, the configuration data that is sent to one or more of the network elements 101-104 may comprise one or more configuration programs each of which comprising one or more computer executable instructions defining an action or a chain of actions to be executed in conjunction with managing data in the network element under consideration. The action or the chain of actions defined by the configuration program may comprise for example: recording data into a memory, modifying the data, selecting one or more of egress ports of the network element and forwarding the data and its possible duplicates to the selected one or more egress ports, selecting one or more look-up tables of a configuration system of the network element and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data.

At least one of the network elements 101-104 is assumed have a modular structure so that the network element under consideration comprises functional entities capable of transferring data between each other. Each functional entity can be, for example, a line interface module of the network element or a part of a line interface module such as an egress-side of the line interface module or an ingress-side of the line interface module. On the other hand, it is also possible that a functional entity includes two or more separate physical entities. For example, a functional entity may comprise e.g. a line interface module and e.g. a switch fabric module. Furthermore, it is also possible that two or more functional entities share a same physical entity, e.g. a first functional entity may comprise a first line interface module and a switch fabric module, and a second functional entity may comprise a second line interface module and the said switch fabric module. The functional entities considered here are configurable with configuration data received from the controller 105. It is, naturally possible that the network element under consideration comprises also such functional entities which are not configurable with the said configuration data.

The above-mentioned network element is adapted to transmit, to the controller 105 of the software-defined network, one or more entity-specific capability descriptors related to the one or more functional entities that are configurable with the above-mentioned configuration data. Each of the entity-specific capability descriptors expresses operations capable of being carried out by the functional entity related to the entity-specific capability descriptor under consideration. Therefore, the controller 105 is made aware of the capabilities of the functional entities, and thus the controller is enabled to configure each functional entity individually in accordance with the capabilities and resources of the functional entity under consideration. It is to be noted that the controller 105 does not necessarily have to receive the entity-specific capability descriptors from the network element comprising the functional entities under consideration. It is also possible that the entity-specific capability descriptors are delivered to the controller 105 in some other way, e.g. via the terminal device 107.

An entity-specific capability descriptor may express, for example, whether or not the functional entity under consideration supports the L3 network layer routing and/or the L2 data link layer switching, and/or the MultiProtocol Label Switching MPLS. The "L3" refers to the Open System Interconnection "OSI" Level 3 network layer protocol, e.g.

the Internet Protocol "IP", and the "L2" refers to the OSI Level 2 data link layer protocol, e.g. the Ethernet. Sometimes the MPLS is regarded as an OSI Level 2.5 "L2.5" protocol. As a second example, an entity-specific capability descriptor may express whether or not the functional entity under consideration supports one or more of the following: ingress functionalities for receiving data from outside of the network element, egress functionalities for transmitting data out from the network element, switching functionalities for relaying data between other ones of the functional entities. As a third example, an entity-specific capability descriptor may express whether or not the functional entity under consideration is capable of supporting the Deep Packet Inspection "DPI". The Deep Packet Inspection that is also called complete packet inspection and Information extraction "IX" is a form of data filtering that examines the payload data part, and possibly also the header, of a data packet when the data packet passes an inspection point in order to search for protocol non-compliance, viruses, spam, intrusions, and/or defined criteria to decide whether the packet may pass or if the packet needs to be routed to a different destination or to be discarded. The Deep Packet Inspection can be used also for the purpose of collecting statistical information. As a fourth example, an entity-specific capability descriptor may express whether or not the functional entity related to the entity-specific capability descriptor under consideration is capable of supporting the Internet Protocol Security "IPsec". The Internet Protocol Security is a technology protocol suite for securing Internet Protocol "IP" communications by authenticating and encrypting each IP packet of a communication session. The IPsec also includes protocols for establishing mutual authentication between agents at the beginning of a session and negotiation of cryptographic keys to be used during the session. IPsec is an end-to-end security scheme operating in the Internet Layer of the Internet Protocol Suite. It can be used in protecting data flows between a pair of hosts "host-to-host", between a pair of security gateways "network-to-network", or between a security gateway and a host "network-to-host". As a fifth example, an entity-specific capability descriptor may express limitations relating to structures and interconnections of look-up tables implementable in the functional entity under consideration. As a sixth example, an entity-specific capability descriptor may express whether or not the functional entity under consideration is capable of delivering signaling data to one or more other of the functional entities, wherein the signaling data is determined at least partly in accordance with the configuration data received from the controller 105, and is additional to data received from the other network elements when the network element is operating in accordance with the configuration data. The signaling data can be, for example, metadata which is related to data being managed and transferred between functional entities. The signaling data can be used for implementing internal functionalities of the network element. The internal functionalities may comprise, for example, work sharing between the functional entities so that a functional entity, e.g. a line interface module acting as an ingress side, determines actions to be directed to data being managed and orders one or more other functional entities, e.g. a line interface module acting as an egress side, to carry out the determined actions. It is to be noted that the above-presented set of the examples is not exhaustive but an entity-specific capability descriptor may express one or more of the above-presented examples and/or one or more other capabilities and resources of a functional entity under consideration.

The controller 105 is adapted to form entity-specific portions of the configuration data for the functional entities of the network element under consideration in accordance with the entity-specific capability descriptors related to the functional entities. The controller is further adapted to provide the entity-specific portions of the configuration data with entity-identifiers so as to enable the network element to allocate each entity-specific portion of the configuration data to an appropriate functional entity and to configure each of the functional entities with an appropriate entity-specific portion of the configuration data. The controller is adapted to transmit the configuration data to the network element under consideration. The network element is adapted recognize the entity-specific portions from the configuration data received from the controller 105, and allocate the entity-specific portions of the configuration data to the respective ones of the functional entities. Thereafter, each functional entity can be configured individually on the basis of the relevant entity-specific portion of the configuration data. Hence, the controller 105 can be adapted to customize the configuration systems implemented in the functional entities in accordance with the capabilities and resources of the functional entities.

Figure 2:
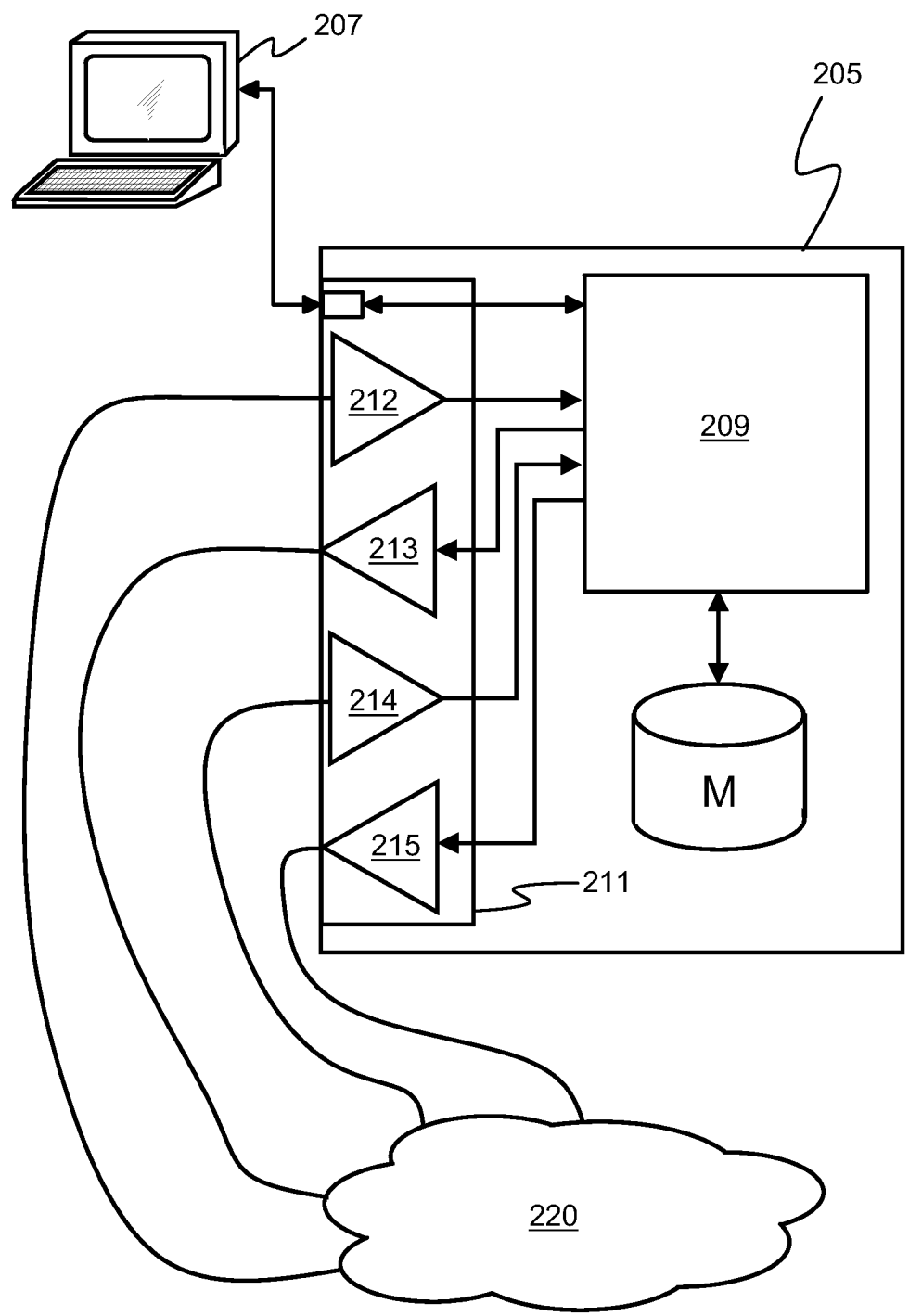
FIG. 2 shows a schematic illustration of a controller according to an exemplifying embodiment of the invention for configuring a network element of a software-defined network.

FIG. 2 shows a schematic illustration of a controller 205 according to an exemplifying embodiment of the invention for configuring a network element of a software-defined network. In this exemplifying case, the controller is a single apparatus but, as mentioned earlier in this document, the controller could as well be a combination of a plurality of apparatuses. The controller comprises a data transfer interface 211 for receiving data and for transmitting data. The data transfer interface 211 comprises ingress ports 212 and 214 and egress ports 213 and 215 for connecting via data transfer links to a data transfer network 220. The controller comprises a processing system 209 adapted to construct configuration data that enables functional entities of the network element to be configured so that the network element is able to operate as a part of the software-defined network. The processing system 209 is further adapted to control the data transfer interface 211 to send the configuration data to the network element to be configured.

The processing system 209 is adapted to form entity-specific portions of the configuration data for the functional entities of the network element in accordance with entity-specific capability descriptors related to the functional entities. Each of the entity-specific capability descriptors expresses operations capable of being carried out by the functional entity that is related to the entity-specific capability descriptor under consideration. The entity-specific capability descriptors can be received from the network element to be configured or the entity-specific capability descriptors can be obtained in some other way, e.g. via a terminal device 207. The processing system 209 is adapted to provide the entity-specific portions of the configuration data with entity-identifiers so as to enable the network element to allocate the entity-specific portions of the configuration data to the respective ones of the functional entities and to configure each of the functional entities with an appropriate entity-specific portion of the configuration data. The entity-identifiers can be, for example, numbers or other labels identifying the functional entities of the network element to be configured. Thus, the controller 205 can control each of the functional entities of the network element individually so that the controller can define, for example, a look-up table system for a given functional entity in an entity-specific manner in accordance with the capabilities and resources of the functional entity under consideration.

Furthermore, the controller 205 can be adapted to utilize the entity-specific capability descriptors related to various network elements when determining the work sharing between the network elements.

In a controller according to an exemplifying embodiment of the invention, the processing system 209 is adapted to form the configuration data so that the network element gets configured to forward data to another network element in response to a situation in which, according to the entity-specific capability descriptors, the functional entities of the network element are unable to carry out an operation required to be directed to the data under consideration and the other network element is capable of carrying out the required operation. For example, the network element may comprise functional entities supporting the L2 data link layer switching and none of the functional entities of the network element is capable of supporting the L3 network layer routing. In this case, the L3 network layer routing services can be provided by forwarding the data under consideration to the other network element that supports the L3 network layer routing. Therefore, in this exemplifying case, the L3 network layer routing services are provided by circulating the data via the other network element that supports the L3 network layer routing.

The processing system 209 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
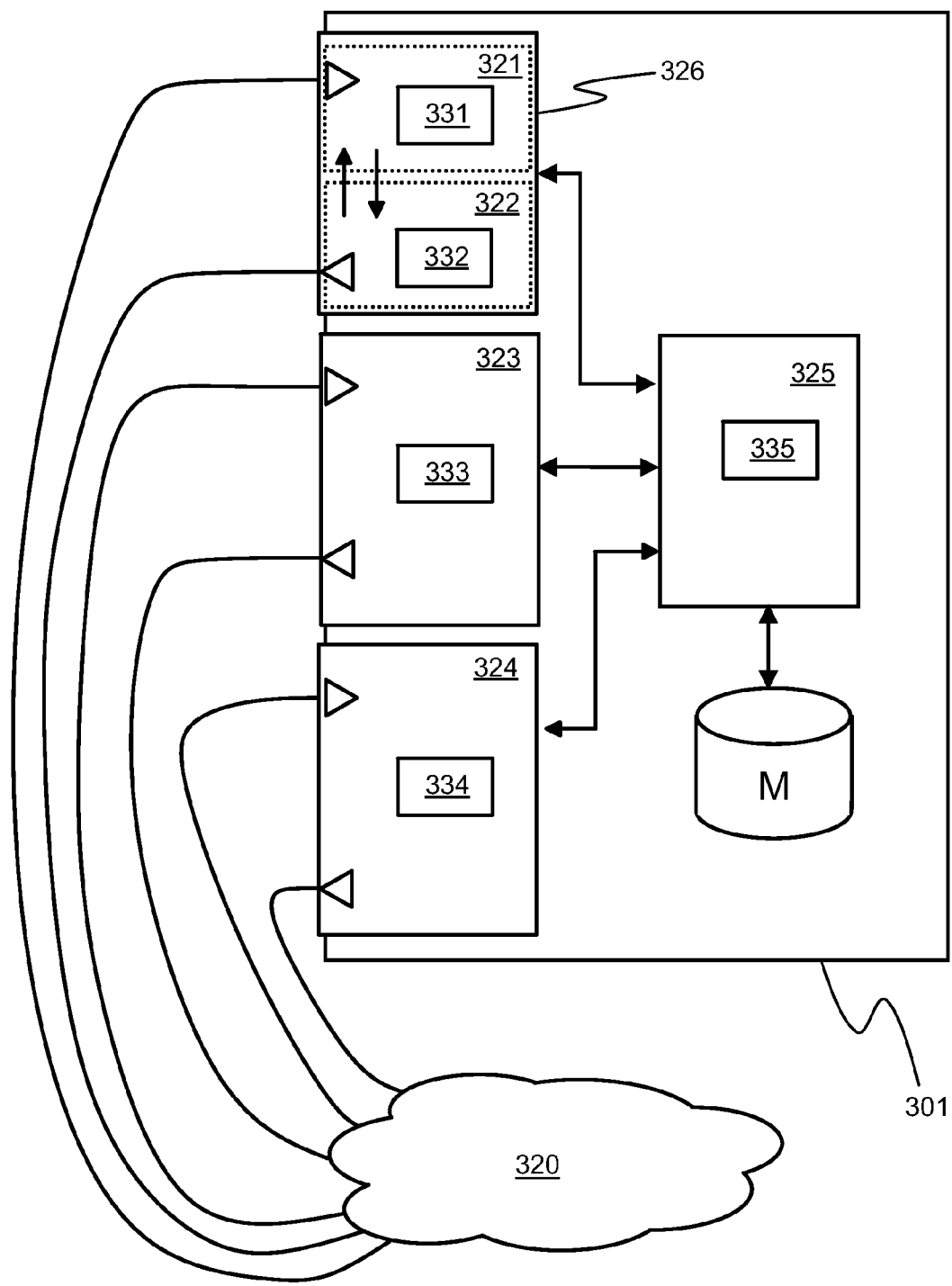
FIG. 3 shows a schematic illustration of a network element according to an exemplifying embodiment of the invention.

FIG. 3 shows a schematic illustration of a network element 301 according to an exemplifying embodiment of the invention for a software-defined network. The network element can be, for example, an Internet Protocol "IP" router, a Multiprotocol label switching "MPLS" switch, a packet optical switch, and/or an Ethernet switch. The network element comprises functional entities 321, 322, 323, 324 and 325. In this exemplifying case, the functional entities 321, 323 and 324 comprise receivers for receiving data from outside of the network element, i.e. from a data transfer network 320, and the functional entities 322, 323 and 324 comprise transmitters for transmitting data out from the network element, i.e. to the data transfer network 320. The functional entities 323 and 324 are line interface modules, the functional entity 321 is an ingress side of a line interface module 326, and the functional entity 322 is an egress side of the line interface module 326. The functional entity 325 is a control unit. The functional entity 325 could also act as a switching entity that provides data transfer connections between the line interface modules of the network element. It is also possible that the line interface modules are full mesh connected so that each line interface module has a direct data transfer connection to any other line interface module. In this exemplifying case we assume that each of the functional entities 321-325 is configurable with configuration data received from a controller of the software-defined network. The network element 301 may further comprise such functional entities which are not configurable with the configuration data. Functional entities which are not configurable with the configuration data are not shown in FIG. 2.

The network element 301 comprises a processing system adapted to control the network element to transmit, to the controller of the software-defined network, one or more entity-specific capability descriptors related to one or more of the functional entities 321-325. Each of the entity-specific capability descriptors expresses operations capable of being carried out by the functional entity related to the entity-specific capability descriptor under consideration. The entity-specific capability descriptors enable the controller of the software-defined network to form entity-specific portions of the configuration data for the functional entities 321-335 in accordance with the capabilities and resources of the functional entities.

The above-mentioned processing system can be located in a one of the functional entities, i.e. in a control unit, adapted to configure the other functional entities in a centralized manner. It is also possible that the processing system is decentralized in the functional entities so that each functional entity is capable of configuring itself. Furthermore, it is also possible that the processing system is decentralized in some of the functional entities so that certain functional entities are capable of configuring themselves and other functional entities too. In the exemplifying case illustrated in FIG. 2, the above-mentioned processing system can be a functional block 335 when the functional entities 321-324 are configured in a centralized manner. For another example, the processing system may comprise the functional block 335 and functional blocks 331, 332, 333, and 334 when each of the functional entities 321-325 is adapted to configure itself.

Each of the functional blocks 331-335 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA". The functional blocks 331 and 332 that belong to the same line interface module 326 can be implemented with same hardware.

The processing system is adapted recognize the entity-specific portions from the configuration data, allocate the entity-specific portions of the configuration data to respective ones of the functional entities, and configure the functional entities on the basis of the entity-specific portions of the configuration data. In an exemplifying case where the functional entities 321-324 are configured in a centralized manner, the above-mentioned processing system can be the functional block 335. In this case, the functional block 335 can be adapted to recognize the entity-specific portions from the configuration data and to configure each of the functional entities 321-325 on the basis of the relevant entity-specific portion of the configuration data. In another exemplifying case where each functional entity configures itself, the above-mentioned processing system can comprise the functional blocks 331-335. In this case, each of the functional blocks 331-335 recognizes, from the configuration data, the entity-specific portion that is relevant to the functional entity under consideration and configures the functional entity in accordance with the relevant entity-specific portion of the configuration data. The functional blocks 331-335 can also comprise means for implementing the configuration systems for supporting the required data-forwarding functionalities. Each configuration system may comprise, for example, a look-up table system constructed in accordance with the appropriate entity-specific portion of the configuration data.

In a network element according to an exemplifying embodiment of the invention, the processing system is adapted to configure, in accordance with the appropriate entity-specific portion of the configuration data, the functional entity 321, i.e. the egress side of the line interface module 326, to be capable of forwarding data to the functional entity 322, i.e. the ingress side of the line interface module 326, in response to a situation in which the data is deemed to need processing related to the ingress side of the line interface module. This provides an option to go back to the ingress side if needed. In a network element according to an exemplifying embodiment of the invention, the ingress and egress sides of two or more of the line interface modules are handled as separate functional entities. This provides an option to send data from an egress side of a line interface module back to the ingress side of another line interface module which has originally received the data from the data transfer network. The need for returning data back to the ingress side may take place for example when a look-up at the egress side indicates that data under consideration needs to be forwarded also or solely to a destination other than those accessible via the current line interface module.

Figure 4:
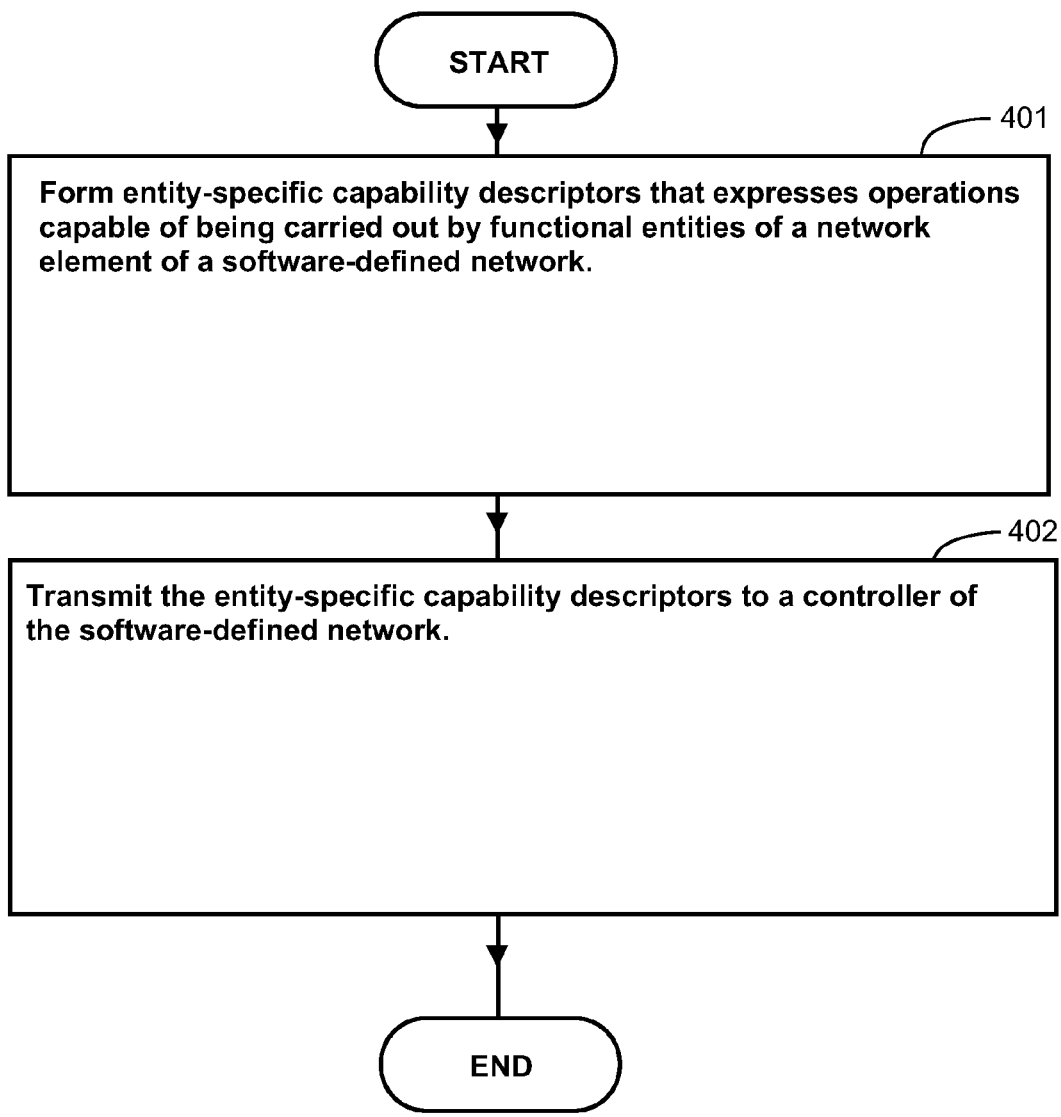
FIG. 4 shows a flow chart of a method according to an exemplifying embodiment of the invention for enabling a controller of a software-defined network to configure a network element of the software-defined network.

FIG. 4 shows a flow chart of a first method according to an exemplifying embodiment of the invention for enabling a controller of a software-defined network to configure a network element of the software-defined network. The network element comprises functional entities capable of transferring data between each other, and one or more of the functional entities are configurable with configuration data received from the controller of the software-defined network. The first method comprises the following actions:

action 401: forming one or more entity-specific capability descriptors related to the one or more functional entities configurable with the configuration data, each of the entity-specific capability descriptors expressing operations capable of being carried out by the functional entity related to the entity-specific capability descriptor under consideration, and action 402: transmitting the one or more entity-specific capability descriptors to the controller of the software-defined network.

Figure 5:
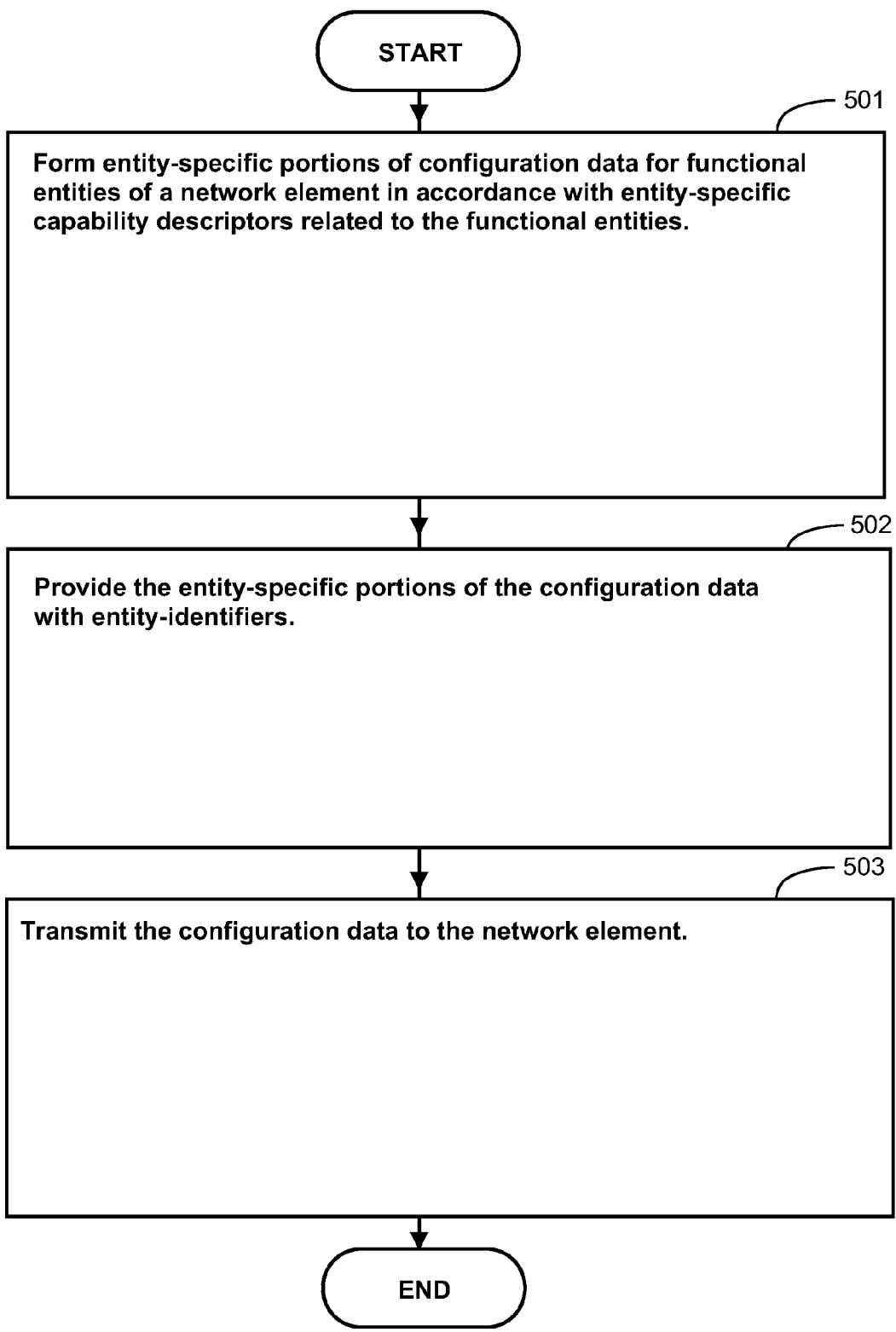
FIG. 5 shows a flow chart of a method according to an exemplifying embodiment of the invention for configuring a network element of a software-defined network.

FIG. 5 shows a flow chart of a second method according to an exemplifying embodiment of the invention for configuring the network element of the software-defined network. The second method comprises the following actions:

action 501: forming entity-specific portions of the configuration data for the functional entities of the network element in accordance with the entity-specific capability descriptors related to the functional entities, action 502: providing the entity-specific portions with entity-identifiers so as to enable the network element to allocate the entity-specific portions to respective ones of the functional entities and to configure each of the functional entities with an appropriate entity-specific portion, and action 503: transmitting the configuration data to the network element.

In the first method and/or the second method according to an exemplifying embodiment of the invention, at least one of the entity-specific capability descriptors expresses whether or not the functional entity related to the entity-specific capability descriptor under consideration supports one or more of the following: L3 network layer routing, L2 data link layer switching, the MultiProtocol Label Switching MPLS.

In the first method and/or the second method according to an exemplifying embodiment of the invention, at least one of the entity-specific capability descriptors expresses whether or not the functional entity related to the entity-specific capability descriptor under consideration supports one or more of the following: ingress functionalities for receiving data from outside of the network element, egress functionalities for transmitting data out from the network element, switching functionalities for relaying data between other ones of the functional entities.

In the first method and/or the second method according to an exemplifying embodiment of the invention, at least one of the entity-specific capability descriptors expresses whether or not the functional entity related to the entity-specific capability descriptor under consideration is capable of supporting the Deep Packet Inspection "DPI".

In the first method and/or the second method according to an exemplifying embodiment of the invention, at least one of the entity-specific capability descriptors expresses whether or not the functional entity related to the entity-specific capability descriptor under consideration is capable of supporting the Internet Protocol Security "IPsec".

In the first method and/or the second method according to an exemplifying embodiment of the invention, at least one of the entity-specific capability descriptors expresses limitations relating to structures and/or interconnections of look-up tables implementable in the functional entity related to the entity-specific capability descriptor under consideration.

In the first method and/or the second method according to an exemplifying embodiment of the invention, at least one of the entity-specific capability descriptors expresses whether or not the functional entity related to the entity-specific capability descriptor under consideration is capable of delivering signaling data to one or more other of the functional entities, where the signaling data is determined at least partly in accordance with the configuration data and is additional to data received from the other network elements when the network element is operating in accordance with the configuration data.

In the first method and/or the second method according to an exemplifying embodiment of the invention, one or more of the functional entities are line interface modules each comprising a receiver for receiving data from outside of the network element and a transmitter for transmitting data out from the network element.

In the first method and/or the second method according to an exemplifying embodiment of the invention, at least one of the functional entities is an ingress side of a line interface module comprising a receiver for receiving data from outside of the network element, and at least one of the functional entities is an egress side of the line interface module comprising a transmitter for transmitting data out from the network element.

A computer program according to an exemplifying embodiment of the invention comprises computer executable instructions for controlling a programmable processing system to carry out a method according to any of the above-described exemplifying embodiments of the invention.

A computer program according to an exemplifying embodiment of the invention comprises software modules for controlling a network element of a software-defined network. The software modules comprise computer executable instructions for controlling a programmable processing system of the network element to control the network element to transmit, to a controller of the software-defined network, one or more entity-specific capability descriptors related to one or more functional entities of the network element. Each of the one or more functional entities is configurable with configuration data received from the controller, and each of the entity-specific capability descriptors expresses operations capable of being carried out by the functional entity related to the entity-specific capability descriptor under consideration.

A computer program according to an exemplifying embodiment of the invention comprises software modules for controlling the controller of the software-defined network. The software modules comprise computer executable instructions for controlling a programmable processing system of the controller to:
- form entity-specific portions of configuration data for functional entities of a network element in accordance with entity-specific capability descriptors related to the functional entities, and
- provide the entity-specific portions of the configuration data with entity-identifiers so as to enable the network element to allocate the entity-specific portions of the configuration data to the respective ones of the functional entities and to configure each of the functional entities with an appropriate entity-specific portion of the configuration data.

A computer program according to an exemplifying embodiment of the invention comprises the above-mentioned software modules for controlling the network element of the software-defined network and the above-mentioned software modules for controlling the controller of the software-defined network.

The software modules can be e.g. subroutines or functions implemented with a suitable programming language and with a compiler suitable for the programming language and the programmable processing system.

A computer program product according to an exemplifying embodiment of the invention comprises a computer readable medium, e.g. a compact disc "CD", encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A network element for a software-defined network, the network element comprising:
    functional entities that include connections that transfer data between the functional entities regardless of a topology of the software-defined network,
    two or more of the functional entities being configurable with configuration data received from a controller of the software-defined network,
    wherein the network element comprises a processing system that controls the network element to transmit, to the controller of the software-defined network, two or more entity-specific capability descriptors related to the two or more functional entities configurable with the configuration data,
    wherein each one of the entity-specific capability descriptors expresses operations operable to be carried out by a functional entity related thereto, and
    wherein at least one of the entity-specific capability descriptors expresses limitations relating to structures and interconnections of one or more look-up tables defining actions implementable by a functional entity related to the at least one entity-specific capability descriptor.

2. The network element according to claim 1, wherein at least one of the entity-specific capability descriptors expresses whether or not the functional entity related to the entity-specific capability descriptor under consideration supports one or more of the following: L3 network layer routing, L2 data link layer switching, the MultiProtocol Label Switching MPLS.

3. The network element according to claim 1, wherein at least one of the entity-specific capability descriptors expresses whether or not the functional entity related to the entity-specific capability descriptor under consideration supports one or more of the following: ingress functionalities for receiving data from outside of the network element, egress functionalities for transmitting data out from the network element, switching functionalities for relaying data between other ones of the functional entities.

4. The network element according to claim 1, wherein at least one of the entity-specific capability descriptors expresses whether or not the functional entity related to the entity-specific capability descriptor under consideration supports Deep Packet Inspection DPI.

5. The network element according to claim 1, wherein at least one of the entity-specific capability descriptors expresses whether or not the functional entity related to the entity-specific capability descriptor under consideration supports Internet Protocol Security IPSec.

6. The network element according to claim 1, wherein at least one of the entity-specific capability descriptors expresses whether or not the functional entity related to the entity-specific capability descriptor under consideration is operable to deliver signaling data to one or more other of the functional entities, the signaling data being determined at least partly in accordance with the configuration data and being additional to data received from the other network elements when the network element is operating in accordance with the configuration data.

7. The network element according to claim 1, wherein one or more of the functional entities are line interface modules each comprising a receiver for receiving data from outside of the network element and a transmitter for transmitting data out from the network element.

8. The network element according to claim 1, wherein at least one of the functional entities is an ingress side of a line interface module comprising a receiver for receiving data from outside of the network element, and at least one of the functional entities is an egress side of the line interface module comprising a transmitter for transmitting data out from the network element.

9. The network element according to claim 1, wherein the network element is at least one of the following: an Internet Protocol IP router, a MultiProtocol Label Switching MPLS switch, a packet optical switch, an Ethernet switch.

10. A controller for configuring a network element of a software-defined network, where the network element includes functional entities forming connections for transferring data between the functional entities regardless of a topology of the software-defined network, the controller comprising:
    a data transfer interface for receiving data from the network element and for transmitting data to the network element, and
    a processing system for forming configuration data for the network element,
    wherein the processing system includes a processor and a memory, the memory having programming code stored therein that, upon execution by the processor, causes the processing system to:
        form entity-specific portions of the configuration data for the functional entities of the network element in accordance with entity-specific capability descriptors related to the functional entities, and provide the entity-specific portions of the configuration data with entity-identifiers so as to enable the network element to allocate the entity-specific portions of the configuration data to respective ones of the functional entities and to configure each of the functional entities with an appropriate entity-specific portion of the configuration data, wherein each one of the entity-specific capability descriptors expresses operations operable to be carried out by the a functional entity related thereto, and wherein at least one of the entity-specific capability descriptors expresses limitations relating to structures and interconnections of one or more look-up tables defining actions implementable by a functional entity related to the at least one entity-specific capability descriptor.

11. The controller according to claim 10, wherein the processing system forms the configuration data so that the network element gets configured to forward data to another network element in response to a situation in which, according to the entity-specific capability descriptors, the functional entities of the network element are unable to carry out an operation required to be directed to the data under consideration and the other network element is operable to carry out the required operation.

12. A method for enabling a controller of a software-defined network to configure a network element of a software-defined network, the network element comprising functional entities including connections that transfer data between the functional entities regardless of a topology of the software-defined network, and two or more of the functional entities being configurable with configuration data received from the controller of the software-defined network, the method comprising:

transmitting, to the controller of the software-defined network, two or more entity-specific capability descriptors related to the two or more functional entities configurable with the configuration data, wherein each one of the entity-specific capability descriptors expresses operations operable to be carried out by the functional entity related thereto, and wherein at least one of the entity-specific capability descriptors expresses limitations relating to structures and interconnections of one or more look-up tables define actions implementable by a functional entity related to the at least one entity-specific capability descriptor.

13. The method according to claim 12, wherein at least one of the entity-specific capability descriptors expresses whether or not the functional entity related to the entity-specific capability descriptor under consideration supports one or more of the following: L3 network layer routing, L2 data link layer switching, the MultiProtocol Label Switching MPLS.

14. The method according to claim 12, wherein at least one of the entity-specific capability descriptors expresses whether or not the functional entity related to the entity-specific capability descriptor under consideration supports one or more of the following: ingress functionalities for receiving data from outside of the network element, egress functionalities for transmitting data out from the network element, switching functionalities for relaying data between other ones of the functional entities.

15. The method according to claim 12, wherein at least one of the entity-specific capability descriptors expresses whether or not the functional entity related to the entity-specific capability descriptor under consideration supports Deep Packet Inspection DPI.

16. The method according to claim 12, wherein at least one of the entity-specific capability descriptors expresses whether or not the functional entity related to the entity-specific capability descriptor under consideration supports Internet Protocol Security IPSec.

17. The method according to claim 12, wherein at least one of the entity-specific capability descriptors expresses limitations relating to structures and interconnections of look-up tables implementable in the functional entity related to the entity-specific capability descriptor under consideration.

18. The method according to claim 12, wherein at least one of the entity-specific capability descriptors expresses whether or not the functional entity related to the entity-specific capability descriptor under consideration is operable to deliver signaling data to one or more other of the functional entities, the signaling data being determined at least partly in accordance with the configuration data and being additional to data received from the other network elements when the network element is operating in accordance with the configuration data.

19. The method according to claim 12, wherein one or more of the functional entities are line interface modules each comprising a receiver for receiving data from outside of the network element and a transmitter for transmitting data out from the network element.

20. The method according to claim 12, wherein at least one of the functional entities is an ingress side of a line interface module comprising a receiver for receiving data from outside of the network element, and at least one of the functional entities is an egress side of the line interface module comprising a transmitter for transmitting data out from the network element.

21. A method for configuring a network element of a software-defined network, the network element comprising functional entities including connections that transfer data between the functional entities regardless of a topology of the software-defined network, and two or more of the functional entities being configurable with configuration data received from a controller of the software-defined network, the method comprising:

forming configuration data for the network element, and transmitting the configuration data to the network element, wherein the forming the configuration data comprises:

forming entity-specific portions of the configuration data for the functional entities of the network element in accordance with entity-specific capability descriptors related to the functional entities, and providing the entity-specific portions of the configuration data with entity-identifiers so as to enable the network element to allocate the entity-specific portions of the configuration data to respective ones of the functional entities and to configure each of the functional entities with an appropriate entity-specific portion of the configuration data, wherein each one of the entity-specific capability descriptors expresses operations operable to be carried out by a functional entity related thereto, and wherein at least one of the entity-specific capability descriptors expresses limitations relating to structures and interconnections of one or more look-up tables defining actions implementable by a functional entity related to the at least one entity-specific capability descriptor.

22. A non-transitory computer readable medium encoded with a computer program comprising computer executable instructions for controlling a programmable processing system of a network element of a software-defined network to:
control the network element to transmit, to a controller of the software-defined network, two or more entity-specific capability descriptors related to two or more functional entities of the network element, the functional entities including connections that transfer data between the functional entities regardless of a topology of the software-defined network,
wherein each of the two or more functional entities is configurable with configuration data received from the controller, and each one of the entity-specific capability descriptors expresses operations operable to be carried out by a functional entity related thereto, and
wherein at least one of the entity-specific capability descriptors expresses limitations relating to structures and interconnections of one or more look-up tables defining actions implementable by a functional entity related to the at least one entity-specific capability descriptor.

23. The non-transitory computer readable medium encoded with a computer program according to claim 22, wherein the computer program comprises computer executable instructions for controlling a programmable processing system of the controller of the software-defined network to:
form entity-specific portions of the configuration data for the functional entities of the network element in accordance with the entity-specific capability descriptors, and
provide the entity-specific portions of the configuration data with entity-identifiers so as to enable the network element to allocate the entity-specific portions of the configuration data to respective ones of the functional entities and to configure each of the functional entities with an appropriate entity-specific portion of the configuration data.

* * * * *